(12) United States Patent
Tekawa (10) Patent No.: US 8,264,677 B2
(45) Date of Patent: Sep. 11, 2012

(54) OPTICAL PATH MONITORING DEVICE AND OPTICAL PATH MONITORING SYSTEM (75) Inventor: Yoshihito Tekawa, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 495 days.

(21) Appl. No.: 12/489,024

(22) Filed: Jun. 22, 2009

(65) Prior Publication Data
US 2009/0323050 A1 Dec. 31, 2009

(30) Foreign Application Priority Data

Jun. 25, 2008 (JP) ................. 2008-165761

(51) Int. Cl.
G01N 21/00 (2006.01)
(52) U.S. Cl. ...................................... 356/73.1
(58) Field of Classification Search ................. 356/73.1; 398/9–24
See application file for complete search history.

(56) References Cited

U.S. PATENT DOCUMENTS
2008/0106731 A1* 5/2008 Iwasaki ........................ 356/73.1

FOREIGN PATENT DOCUMENTS
JP 2008-020229 A 1/2008

* cited by examiner

Primary Examiner — Tarifur Chowdhury
Assistant Examiner — Tara S Pajoohi Gomez
(74) Attorney, Agent, or Firm — Sughrue Mion, PLLC (57) ABSTRACT An optical path monitoring device according to the present invention includes: a measurement unit which irradiates optical pulses to an optical path as a monitoring target to cause back scattered lights, the measurement unit generating measurement data based on the back scattered lights; and a processing unit which controls operation of the measurement unit, the processing unit acquiring the measurement data from the measurement unit, the processing unit performing an arithmetic processing of the measurement data to identify an abnormal point of the optical path, and after acquiring the measurement data the processing unit sending the measurement unit instructions to start the next measurement.

15 Claims, 5 Drawing Sheets

OPTICAL PATH MONITORING DEVICE AND OPTICAL PATH MONITORING SYSTEM

BACKGROUND OF THE INVENTION

1. Field of the Invention

The present invention relates to an optical path monitoring device and an optical path monitoring system which monitors the state of an optical path such as an optical fiber.

Priority is claimed on Japanese Patent Application No. 2008-165761, filed Jun. 25, 2008, the content of which is incorporated herein by reference.

2. Description of Related Art

As is generally known, an optical time domain reflectometer (OTDR) is a device which identifies optical transmission characteristics and abnormal points of an optical path by detecting a back scattered light of an optical pulse irradiated as a measuring light to the optical path. The optical time domain reflectometer is used as a measuring device or a monitoring device for an optical path.

An optical path monitoring system, which is a combination of an optical time domain reflectometer, an optical power meter (OPM) and a personal computer, has recently become commercially practical. The optical path monitoring system controls the optical time domain reflectometer and the optical power meter by using the personal computer, and is applied to an optical path for optical communication. That is, in the optical path monitoring system, under control of the personal computer, the optical power meter detects levels of optical communication signals received from an optical path, and in the case where the optical signal level is abnormal, the optical time domain reflectometer identifies abnormal points of the optical path.

For example, Japanese Unexamined Patent Application, First Publication No. 2008-020229 discloses the details of the above optical path monitoring device.

However, in the above conventional optical path monitoring system, after the personal computer determines that an optical communication signal level is abnormal based on the detection result of the optical power meter, the computer supplies a measuring start instructions to the optical time domain reflectometer, so that the optical time domain reflectometer identifies abnormal points of the optical fiber. In this case, the dead time is defined between from when the personal computer determines that the level of the optical communication signal is abnormal to when the optical time domain reflectometer starts measurement. The conventional optical path monitoring system cannot identify an abnormal point of a short time abnormal phenomenon in the optical fiber. The short time abnormal phenomenon may be a phenomenon such that the optical path is instantaneously interrupted. The short time abnormal phenomenon occurs only within a short period of time, for example, about 1 s. The above-described dead time is a short period of time. In some cases, the short time abnormal phenomenon occurs only within the dead time. In this case, the conventional optical path monitoring system is hardly performed to identify the abnormal point.

Furthermore, the optical time domain reflectometer obtains measuring signals by averaging waveforms of back scattered lights relating to a plurality of optical pulses by signal processing, and then locates and visualizes abnormal points based on the measuring signals. Consequently, the time of measurement performed by the reflectometer becomes relatively long so that it hinders from identifying abnormal points relating to the above short time abnormal phenomenon. Therefore, the conventional optical path monitoring system cannot identify abnormal points relating to a short time abnormal phenomenon and thus it is not practically useful.

SUMMARY OF THE INVENTION

The present invention has been conceived in view of above circumstances, and an object of the present invention is to provide an optical path monitoring device and an optical path monitoring system capable of identifying an abnormal point relating to a short time abnormal phenomenon more reliably by shortening dead time than conventional systems.

In order to achieve the above object, an optical path monitoring device according to the present invention includes: a measurement unit which irradiates optical pulses to an optical path as a monitoring target to cause back scattered lights, the measurement unit generating measurement data based on the back scattered lights; and a processing unit which controls operation of the measurement unit, the processing unit acquiring the measurement data from the measurement unit, the processing unit performing an arithmetic processing of the measurement data to identify an abnormal point of the optical path, and after acquiring the measurement data the processing unit sending the measurement unit instructions to start the next measurement.

In the optical path monitoring device, the processing unit may perform the arithmetic processing within the time period for measurement, and the measurement may be performed by the measurement unit.

In the optical path monitoring device, the processing unit may identify, as the abnormal point, a value of differential data, the identified value may exceed a threshold value, the differential data may represent differences between measurement data and reference data, the measurement data may be acquired during monitoring, and the reference data may be acquired by irradiating the optical pulses to the optical path which normally operates.

An optical path monitoring system according to the present invention includes: an optical path monitoring device which irradiates optical pulses to an optical path as a monitoring target to cause back scattered lights, the optical path monitoring device generating measurement data based on the back scattered lights; a computer which acquires the measurement data from the optical path monitoring device, the computer performing an arithmetic processing of the measurement data to identify an abnormal point of the optical path; and a communication line which connects the optical path measurement device and the computer so as to allow communication therebetween.

In the optical path monitoring system, the computer may store and save the measurement data in a measurement data file, based on receipt of instructions from the outside, the computer may read the measurement data out of the measurement data file and the computer may perform the arithmetic processing of the measurement data, the computer may identify the abnormal point of the optical path based on the result of arithmetic processing.

According to the present invention, after acquiring the measurement data from the measurement unit the processing unit sends the measurement unit instructions to start the next measurement. Consequently, it is possible to shorten dead time compared to conventional systems, and thereby it is possible to identify an abnormal point relating to a short time abnormal phenomenon more reliably.

Moreover, according to an embodiment of the present invention, the optical path monitoring device irradiates optical pulses to an optical path as a monitoring target to cause back scattered lights, and generates measurement data based on the back scattered lights, and the computer acquires the measurement data from the optical path measurement device, and performs an arithmetic processing of the measurement data to identify an abnormal point of the optical path. That is, the measurement process and the arithmetic process of the measurement data obtained by the measurement process are shared between the optical path measuring device and the computer. Consequently, it is possible to identify an abnormal point reliably even when the processing speed of the optical path measurement device is slow.

DETAILED DESCRIPTION OF THE INVENTION

Figure 1:
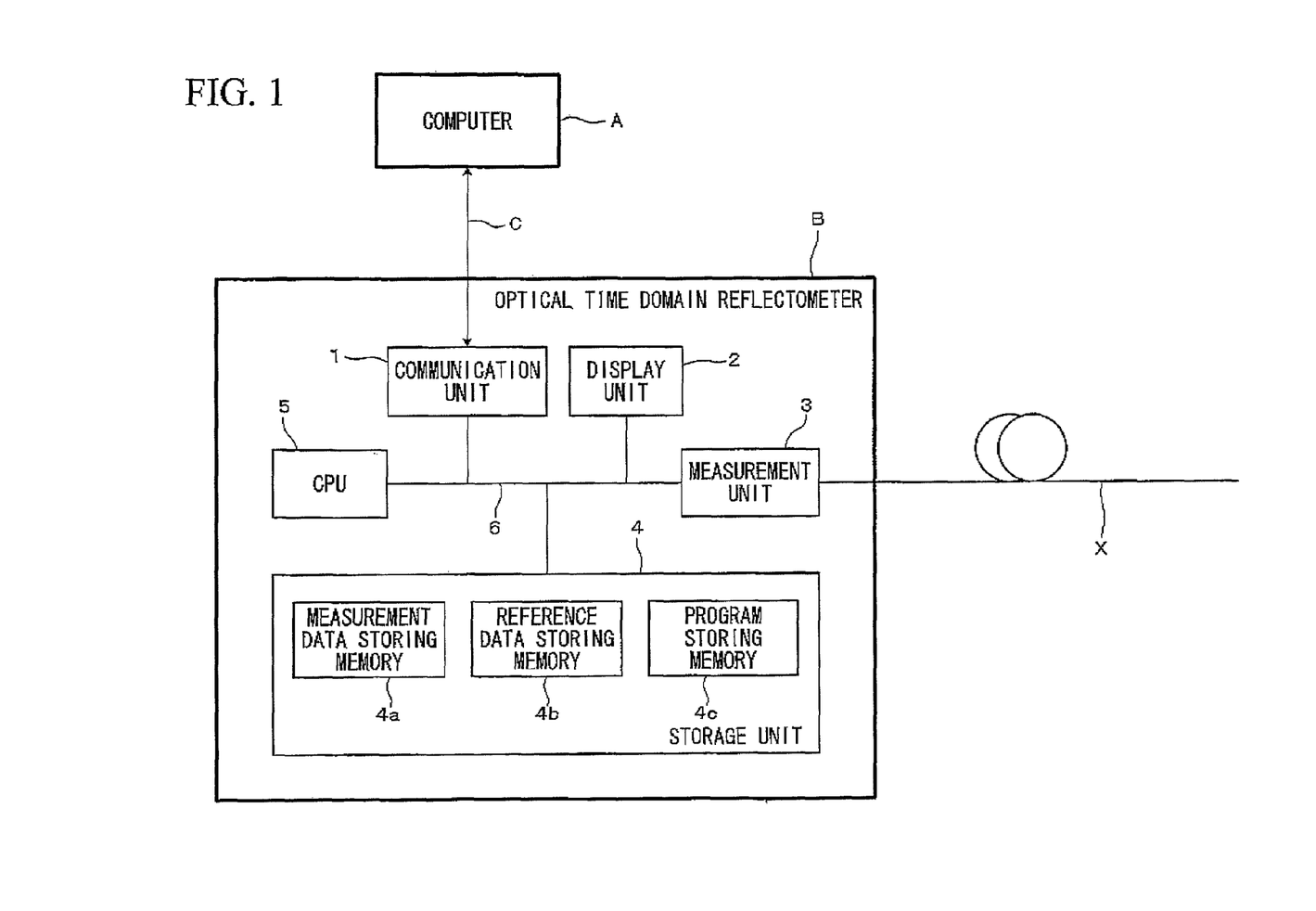
FIG. 1 is a system configuration diagram showing a function configuration of an optical path monitoring system according to one embodiment of the present invention.

An embodiment of the present invention will be described below with reference to the drawings. FIG. 1 is a system configuration diagram showing a function configuration of an optical path monitoring system according to the present embodiment. As shown in the figure, the optical path monitoring system includes a computer A, an optical time domain reflectometer (OTDR) B, and a communication line C.

The computer A may be, for example, a personal computer (PC) having communication functions. The computer A performs as a control device which controls the optical time domain reflectometer B by communicating with the optical time domain reflectometer B through the communication line C. There is pre-installed in the computer A a control program for controlling the optical time domain reflectometer B through the communication line C. The computer A controls the operation of the optical time domain reflectometer B by communicating with the optical time domain reflectometer B based on the control program. The communication specification of the computer A corresponds with the communication specification of a communication unit 1 described below of the optical time domain reflectometer B, and may be, for example, high speed Ethernet (registered trademark) with communication speed of more than 100 Mbps.

As shown in the figure, the optical time domain reflectometer B performs as an optical path measuring device in which the communication unit 1, a display unit 2, measurement unit 3, storage unit 4, and a CPU (central processing unit) 5 are connected with each other by a system bus 6. Among these components, the storage unit 4, the CPU 5, and the system bus 6 constitute a processing unit. The processing unit, the communication unit 1, the communication line C, and the computer A constitute a control processing unit. The communication unit 1 communicates with the computer A based on the predetermined communication specification under control of the CPU 5. The communication specification of the communication unit 1 is high speed Ethernet (registered trademark) with a communication speed of more than 100 Mbps as mentioned above.

The display unit 2 may be, for example, a liquid crystal display. The display unit 2 displays measured waveforms in the measurement unit 3, operating states of the optical time domain reflectometer B and the like under control of the CPU5. The measurement unit 3 identifies an abnormal point of an optical fiber X as a monitoring target. The optical fiber X is an optical path having a predetermined length. The measurement device 3 sequentially irradiates optical pulses into such optical fiber X to cause back scattered lights, and acquires waveforms of the back scattered lights as measurement data (waveform data).

The storage unit 4 includes a measurement data storing memory 4a which stores the above measurement data, a reference data storing memory 4b which stores reference data corresponding to the measurement data, and a program storing memory 4c in which monitoring program is stored in advance. Among each of the memory units, the measurement data storing memory 4a is RAM (random access memory), and the reference data storing memory 4b and the program storing memory 4c are ROM (read only memory).

The above reference data are measurement data (waveform data) of back scattered lights acquired from the optical fiber X by the measurement unit 3 at a time when the soundness of the optical fiber X is ensured, that is, at a time when the optical fiber X is normally operates (for example, at an initial state when the optical fiber X is installed). Such reference data is acquired in advance, and stored in the reference data storing memory 4b.

The CPU5 may be, for example, a 64-bit CISC (complex instruction set computer) processor. The CPU 5 collectively controls the communication unit 1, the display unit 2, the measurement unit 3, and the storage unit 4 via the system bus 6 by executing the above monitoring program. The system bus 6 may be, for example, a PCI (peripheral component interconnect) bus. The system bus 6 connects the communication unit 1, the display unit 2, measurement unit 3, the storage unit 4, and the CPU 5 so as to allow communication therebetween.

The communication line C conforms to the communication specification of the communication unit 1 and the computer A, and may be, for example, a serial communication line which conforms to the communication specification of Ethernet (registered trademark). The communication specifications of the computer A and the communication unit 1 of the optical time domain reflectometer B may be other communication specifications such as high-speed USB (universal serial bus) instead of that of Ethernet (registered trademark).

Next, operations of the optical path monitoring system according to the present embodiment constituted in this way will be described in detail along with a flowchart shown in FIG. 2. This flowchart shows operating procedures of the CPU 5 based on the monitoring program (operations of the optical time domain reflectometer B).

In the optical path monitoring system, when the optical time domain reflectometer B receives a signal indicating a measurement start command (monitor start command) from the computer A through the communication line C, the reflectometer B starts sequential monitoring operations based on the monitoring program. That is, in the optical time domain reflectometer B, when the communication unit 1 receives a measurement start command from the computer A, it supplies this measurement start command to the CPU 5 through the system bus 6. When the measurement start command is supplied to the CPU 5 in this way (Step S1), the CPU 5 sends real-time measurement start instructions to the measurement unit 3 through the system bus 6 (Step S2).

As a result, the measurement unit 3 sequentially irradiates optical pulses to the optical fiber X, and obtains and averages back scattered lights of each pulse to generate measurement data (waveform data). After generating the above measurement data, that is, after completing measurement of the optical fiber X, the measurement unit 3 sends the CPU5 an interruption (measurement completion interruption) indicating this measurement has completed through the system bus 6.

When the above measurement completion interruption is supplied to the CPU 5 (Step S3), the CPU 5 transfers the measurement data in the measurement unit 3 to the measurement data storage memory 4*a* (Step S4). That is, the CPU 5 reads (i.e. acquires) the measurement data from the measurement unit 3 through the system bus 6, and stores and saves the data in the measurement data storage memory 4*a*. After completing transfer of the measurement data in this way, the CPU5 supplies next real-time measurement start instructions to the measurement unit 3 through the system bus 6 (Step S5). As a result, the measurement unit 3 generates next measurement data through second round of measurement, and, aside from this, the CPU 5 performs processes following Step 5.

In parallel with such measurement operations of the measurement unit 3, the CPU 5 converts the measurement data (linear data) stored in the measurement data storage memory 4*a* into dB data (logarithmic data) (Step S6). The dB data is waveform data which shows the waveform levels (amplitude) of back scattered lights in logarithmic form, that is, in dB (decibel). When generation of such dB data is finished, the CPU 5 conducts a wave-filter process to the dB data in order to remove white noise (Step 7). The CPU 5 then generates a differential data which shows the difference between the dB data (measurement waveform) to which this wave-filter process has been performed and the reference data (reference waveform) (Step S8). The CPU 5 finds from this differential data a point where the difference between the measurement waveform and the reference waveform exceeds a predetermined threshold value, and identifies the point as an abnormal point of the optical fiber X (Step S9).

In other words, the CPU5 changes the measurement data in dB. Next, the CPU 5 conducts the wave-filter process to the measurement data in dB. Then, the CPU 5 generates the difference data representing differences between the wave-filter processed measurement data and the reference data. Next, the CPU 5 identifies a value of the difference data exceeding the threshold value as showing an abnormal point of the optical fiber X.

Figure 3A:
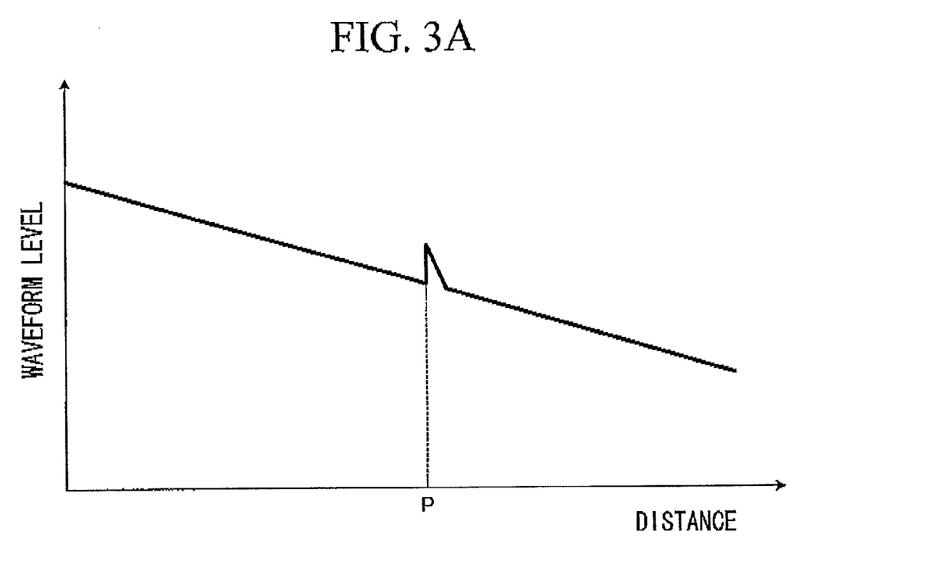
FIGS. 3A and 3B are schematic graphs showing a process of identifying abnormal points in the embodiment of the present invention.
Figure 3B:
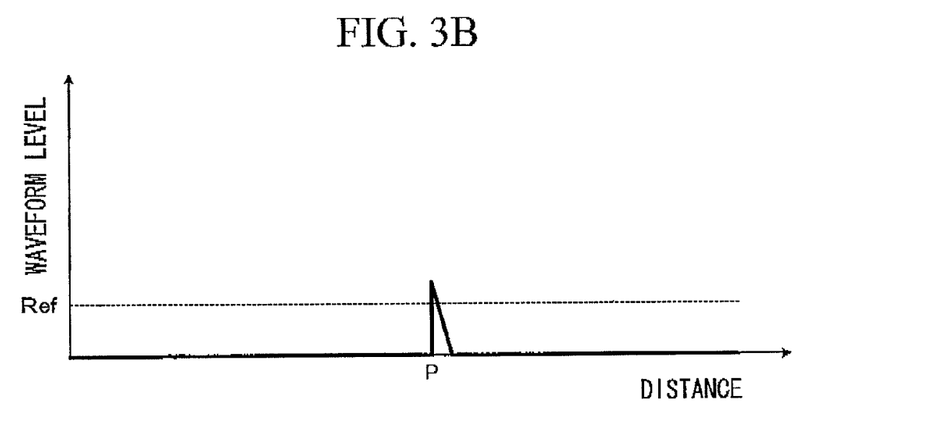

FIGS. 3A and 3B are schematic graphs showing the above process of identifying abnormal points. FIG. 3A is a schematic graph showing a measurement waveform, and FIG. 3B is a schematic graph showing a differential waveform. As shown in FIG. 3A, while the level of the measurement waveform in the optical pulse test B gradually descends with increasing the distance, the waveform level suddenly changes at the abnormal point P. Since the reference waveform is a measurement waveform in a state where abnormalities do not occur, sudden change in the waveform level does not exist. Therefore, such differential waveform of the difference between the measurement waveform and the reference waveform, is flat other than the abnormal point P, and the waveform level thereof suddenly changes only at the abnormal point P as shown in FIG. 3B. By evaluating such differential waveform with a threshold value Ref, the abnormal point P can be identified as a point exceeding the threshold value Ref in the differential waveform.

The above sequential processes of Steps S3 to S9 is performed by the CPU 5 during the measurement time of the measurement unit 3, that is, during the time from when the measurement unit 3 receives real-time measurement start instructions to when it generates measurement data and supplies a measurement completion interruption to the CPU 5. Such measurement time of the measurement unit 3 may be, for example, 200 ms, which is the time required for the measurement unit 3 to perform an averaging process on waveforms over 28 times. That is, the CPU 5 completes the processes of Steps S3 to S9 within 200 ms by when the next measurement completion interruption is supplied to the CPU 5 from the measurement unit 3 based on the next real-time measurement start instructions. In other words, the measurement unit 3 performs the next measurement after receiving the real-time measurement start instructions, and the CPU 5 completes the arithmetic processing within the time of the next measurement.

According to the present embodiment mentioned above, as soon as the CPU 5 transfers measurement data from the measurement unit 3 to the measurement data storage memory 4*a*, it supplies start instructions for next measurement to make the measurement unit 3 perform next measurement. Consequently, according to the present embodiment, dead time can be made shorter than those of conventional systems, and thus, it is possible to identify abnormal points relating to a short time abnormal phenomenon more reliably.

According to the present embodiment, measurement of the optical fiber X is repeated, for example, every 200 ms. Consequently, it is possible to adequately identify abnormal points relating to an abnormal phenomenon which lasts, for example, only about 1 s, and thus, it is possible to provide more practical optical path monitoring device and more practical optical path monitoring system than conventional optical path monitoring systems.

As a modified example of the above embodiment, the computer A may perform the processes of Steps S1 to S9 performed by the CPU 3. In this case, the processes of Steps S1 to S9 are changed as follows. Instead of the processes of Steps S1 and S2, the computer A directly supplies real-time measurement start instructions to the measurement unit 3 through the communication line C and the system bus 6. Upon generation of measurement data, the measurement unit 3 directly supplies a measurement completion interruption to the computer A through the system bus 6 and communication line C. In the same way, in place of the CPU 3, the computer A performs Steps S3 to S9.

As described above, it is preferable that the process of Step 5 be performed before starting the process of Step 6. However, even when performing the process of Step 5 before completing the process of Step 9, it is possible to shorten dead time than conventional systems.

Next, a modified example of process operations according to the present embodiment will be described.

The above explanation of operations describes that the CPU 5 of the optical time domain reflectometer B performs the processes of Steps S4 to S9 based on the measurement data. However, if the processing speed of the CPU 5 is slow, the CPU 5 may not be able to execute the sequential processes of Steps S3 to S9 within the above time period of 200 ms. In order to deal with such situations, according to the present modified example, the measurement data stored in the measurement data storage memory 4*a* are transferred to the computer A through the communication line C, and the computer A executes the processes of Steps S4 to S9 based on the measurement data.

Figure 4:
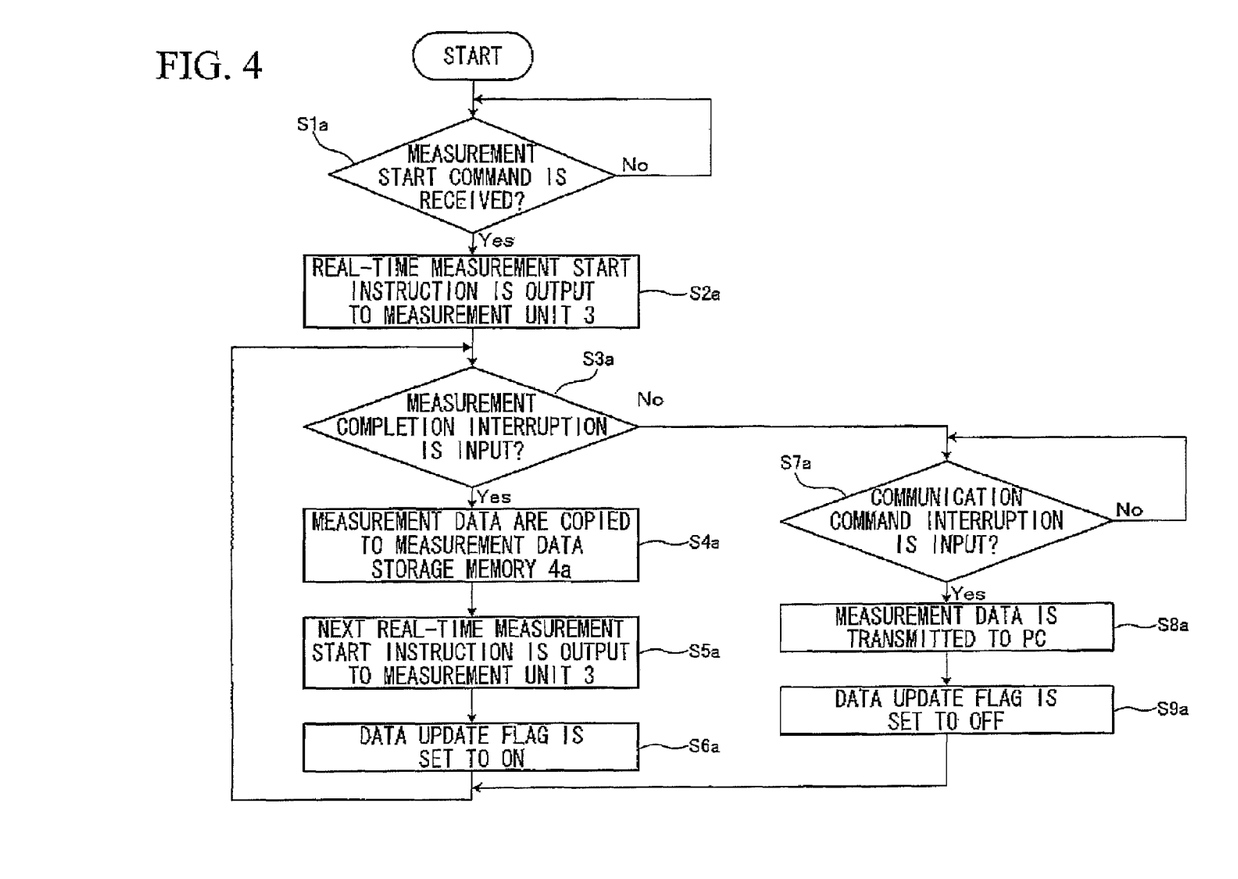
FIG. 4 is a flowchart showing operations of the optical pulse in a modified example of the embodiment of the present invention.

FIG. 4 is a flowchart showing operations of the optical pulse in the present modified example. In this flowchart, the processes of Steps S1a to S5a are the same as the processes of Steps S1 to S5 in the flowchart of FIG. 2, and explanations thereof are therefore omitted.

In the present modified example, when the CPU 5 of the optical time domain reflectometer 5 supplies next real-time measurement start instructions to the measurement unit 3 (Step S5a), it sets a data update flag to "ON" (Step S6a). If a communication command interruption received from the computer A is supplied to the CPU 5 from the communication unit 1 through the system bus 6 (Step S7a), the CPU 5 supplies control instructions to the communication unit 1 through the system bus 6, so that the measurement data stored in the measurement data storage memory 4a are transferred to the computer A through the communication line C (Step S8a). That is, if the communication unit 1 receives control instructions from the CPU 5 through the system bus 6, it reads the measurement data from the measurement data storage memory 4a, and transmits the data to the computer A through the communication line C.

When the transfer of the measurement data to the computer A has completed, the CPU 5 sets the above data update flag to "OFF" (Step S9a). That is, the data update flag in the present modified example shows whether the measurement data stored in the measurement data storage memory 4a has already transferred to the computer A or the data have not transferred to the computer A yet.

Figure 5:
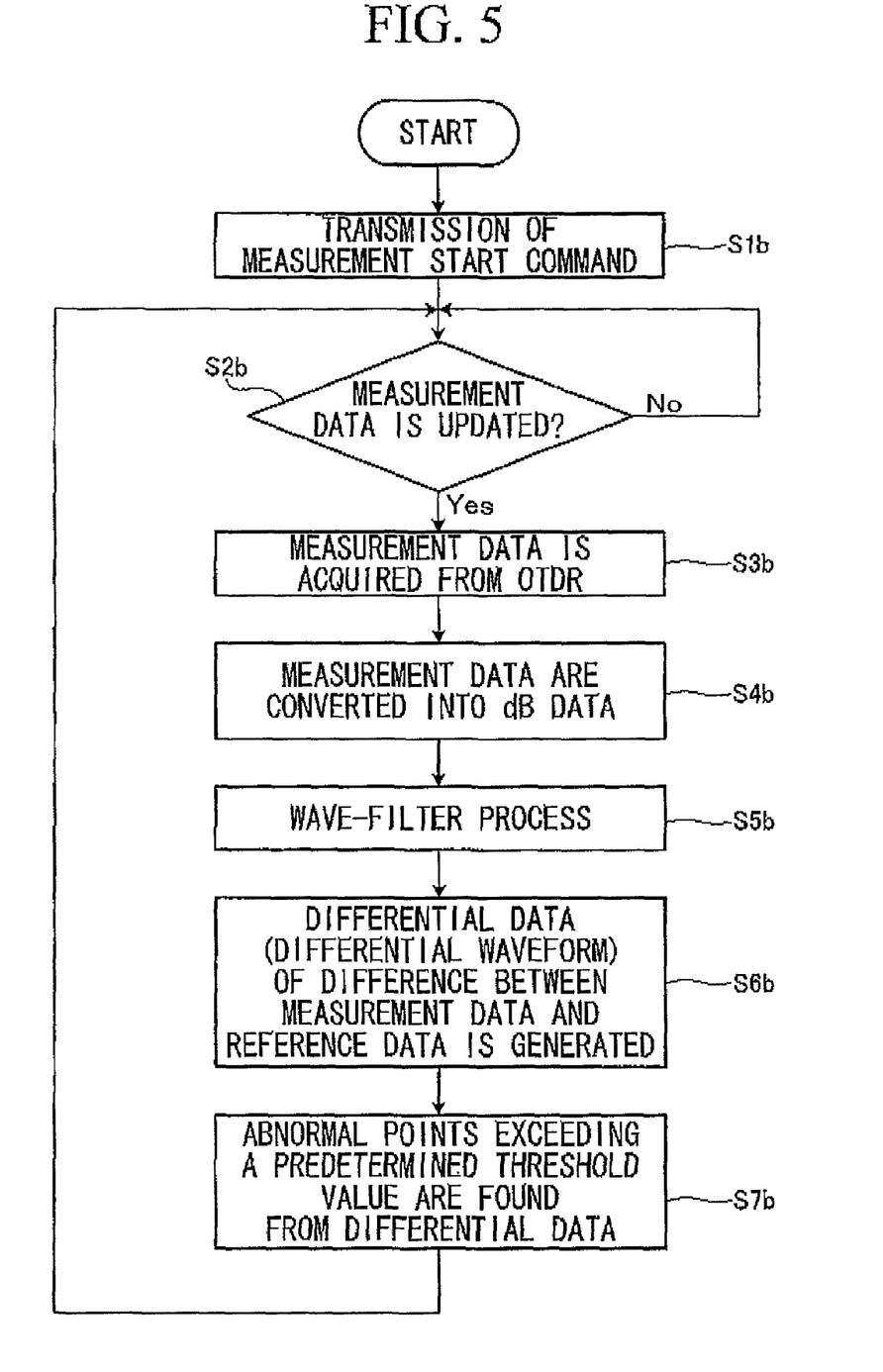
FIG. 5 is a flowchart showing operations of a computer in the modified example of the embodiment of the present invention.

FIG. 5 is a flowchart showing operations of computer A corresponding to such operations of the optical time domain reflectometer B. When the computer A transmits a measurement start command to the optical time domain reflectometer B (Step S1b), it determines the update state of the measurement data by transmitting a reference command of the data update flag to the optical time domain reflectometer B through the communication line C and confirming a state of setting of the data update flag (Step S2b). That is, the computer A determines the update state of the measurement data in the measurement data storage memory 4a of the optical time domain reflectometer B by referencing the above data update flag (Step S2b). In the case where the measurement data has been updated, the computer A transmits a transfer command of the measurement data to the optical time domain reflectometer B through communication line C to acquire the measurement data in the measurement data storage memory 4a (Step S3b).

The computer A converts the measurement data (linear data) into dB data (logarithmic data) (Step S4b), conducts a wave-filter process to the dB data in order to remove white noise (Step S5b), and generates differential data of the difference between the dB data after the wave-filter processed (i.e. measurement waveform) and the reference data (Step S6b). The computer A finds points where the difference between the measurement waveform and the reference waveform exceeds a predetermined threshold value based on the differential data, and identifies the points as abnormal points of the optical fiber X (Step S7b).

According to such modified example, since processes are shared between the computer A and the optical time domain reflectometer B, it is possible to adequately identify abnormal points even in the case where the processing speed of the CPU 5 of the optical time domain reflectometer B is slow. As a result, it is possible to provide more practical optical path monitoring device and more practical optical path monitoring system than conventional optical path monitoring systems.

There may be a case in which the computer A cannot execute the sequential processes shown in FIG. 5 within the time period of not impeding measurement cycles of the optical time domain reflectometer B owing to the operation speed being slow. In such case, the computer A omits the processes of Steps S4b to S7b in FIG. 5, and sequentially acquires measurement data updated by the optical time domain reflectometer B, and successively stores the data as a measurement data file in a storage such as a hard disk drive. Based on the operation instructions input by a user, the computer A reads the measurement data from the measurement data file and identifies abnormal points at a different time separated from the measurement operations of the optical time domain reflectometer B.

That is, there is the case where it is not necessarily to perform identification of abnormal points in real time during monitoring of the optical fiber X. It is also possible to realize sufficiently significant monitoring of the optical fiber X by reading the measurement data stored in the storage after finishing the monitoring as mentioned above, and identifying generation of a short time abnormal phenomenon and detective points.

Figure 2:
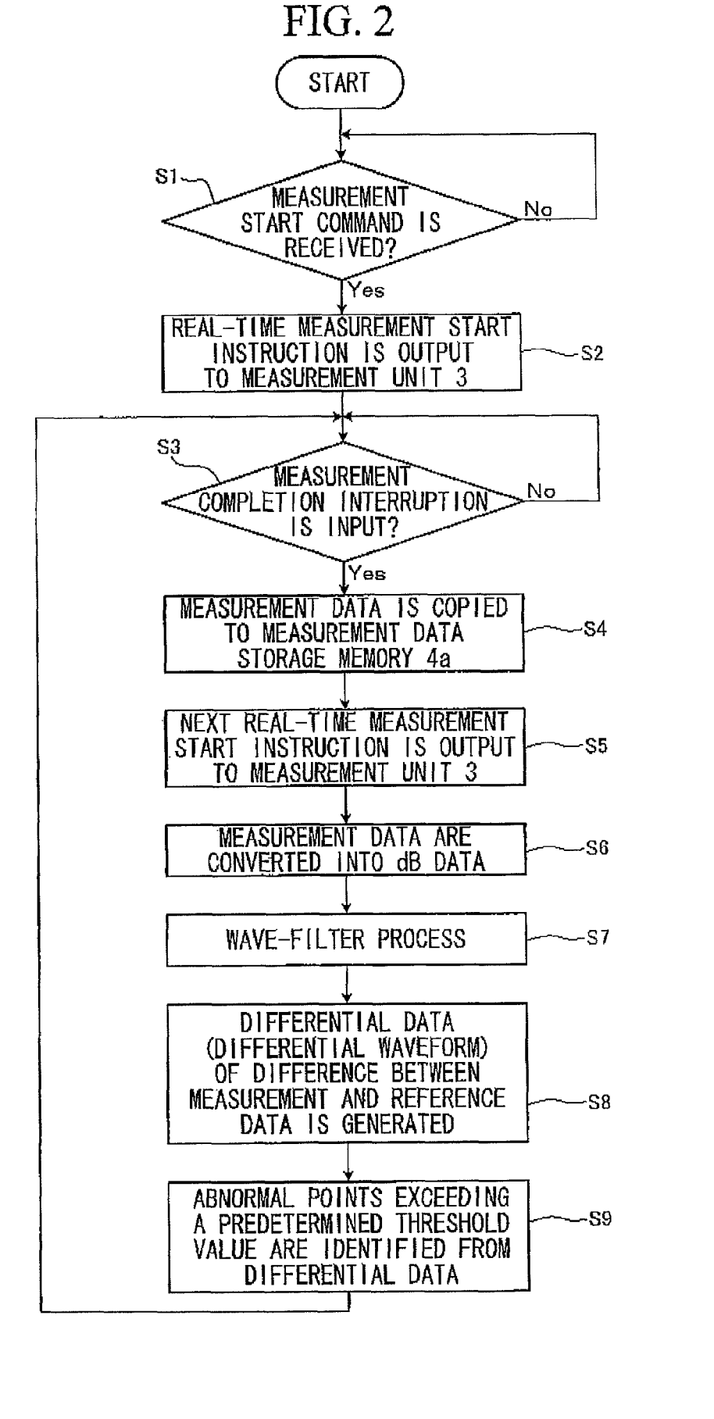
FIG. 2 is a flowchart showing operations of an optical time domain reflectometer shown in FIG. 1.

Moreover, as is the case with the computer A as described above, it is also possible for the optical time domain reflectometer B to omit the processes of Steps S5 to S9 shown in FIG. 2, and sequentially store measurement data acquired from the measurement unit 3 by the CPU 5 of the optical time domain reflectometer B as a measurement data file in the measurement data storage memory 4a, and, after finishing monitoring, read the measurement data out of the measurement data file and perform the processes of Steps S5 to S9.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:
1. An optical path monitoring device comprising:
a measurement unit which irradiates optical pulses to an optical path as a monitoring target to cause back scattered lights, the measurement unit generating measurement data based on the back scattered lights; and
a processing unit which controls operation of the measurement unit, the processing unit acquiring the measurement data from the measurement unit, the processing unit performing an arithmetic processing of the measurement data to identify an abnormal point of the optical path, and
the measurement unit outputting an interruption to the processing unit after generating the measurement data, the interruption indicating that the measurement data has been generated,
after acquiring the interruption from the measurement unit and before completing the arithmetic processing, the processing unit sending the measurement unit instructions to start the next measurement
the processing unit generating differential data representing differences between the measurement data and reference data, the measurement data being acquired during measurement, the reference data being acquired by irradiating the optical pulses to the optical path free from abnormality, and the processing unit identifying, as the abnormal point, a value included in the differential data, the identified value exceeding a threshold value.

2. The optical path monitoring device according to claim 1, wherein the processing unit performs the arithmetic processing within the time period for measurement for which the next measurement being continued to be performed by the measurement unit.

3. The optical path monitoring device according to claim 1, wherein the measurement unit performs the next measurement after receiving the instructions, and the control processing unit completes the arithmetic processing within the time period for measurement for which the next measurement being continued to be performed by the measurement unit.

4. The optical path monitoring device according to claim 1, wherein the processing unit comprises a processing unit and a computer, the processing unit controls the operation of the measurement unit, and the computer performs the arithmetic processing.

5. The optical path monitoring device according to claim 1, wherein before starting the arithmetic processing, the control processing unit sends the measurement unit the instructions.

6. The optical path monitoring device according to claim 5, further comprising a storage unit which stores the measurement data,
wherein after storing the measurement data in the storage unit, the control processing unit sends the instructions.

7. The optical path monitoring device according to claim 1, further comprising a storage unit which stores the measurement data,
wherein after storing the measurement data in the storage unit, the control processing unit sends the instructions.

8. An optical path monitoring system comprising:
an optical path monitoring device comprising a measurement unit and a processing unit, the measurement unit irradiating optical pulses to an optical path as a monitoring target to cause back scattered lights, the measurement unit generating measurement data based on the back scattered lights;
a computer which acquires the measurement data from the optical path measurement device, the computer performing an arithmetic processing of the measurement data to identify an abnormal point of the optical path; and
a communication line which connects the optical path measurement device and the computer so as to allow communication therebetween,
the measurement unit outputting an interruption to the processing unit after generating the measurement data, the interruption indicating that the measurement data has been generated,
after acquiring the interruption from the measurement unit and before completing the arithmetic processing, the processing unit sending the measurement unit instructions to start the next measurement,
the computer generating differential data representing differences between the measurement data and reference data, the measurement data being acquired during measurement, the reference data being acquired by irradiating the optical pulses to the optical path free from abnormality, and the computer identifying, as the abnormal point, a value included in the differential data, the identified value exceeding a threshold value.

9. The optical path monitoring system according to claim 8, wherein the computer stores and saves the measurement data in a measurement data file, based on receipt of instructions from the outside, the computer reads the measurement data out of the measurement data file and the computer performs the arithmetic processing of the measurement data, the computer identifies the abnormal point of the optical path based on the result of arithmetic processing.

10. The optical path monitoring system according to claim 8,
wherein the processing unit controls operation of the measurement unit.

11. A method of controlling an optical path monitoring device, the method comprising:
making a measurement unit irradiate optical pulses to an optical path as a monitoring target to cause back scattered lights, and making the measurement unit generate measurement data based on the back scattered lights;
controlling operation of the measurement unit, acquiring the measurement data from the measurement unit, and performing an arithmetic processing of the measurement data to identify an abnormal point of the optical path;
making the measurement unit output an interruption after generating the measurement data, the interruption indicating that the measurement data has been generated;
after acquiring the interruption from the measurement unit and before completing the arithmetic processing, sending the measurement unit instructions to start the next measurement; and
generating differential data representing differences between the measurement data and reference data, the measurement data being acquired during measurement, the reference data being acquired by irradiating the optical pulses to the optical path free from abnormality, and identifying, as the abnormal point, a value included in the differential data, the identified value exceeding a threshold value.

12. The method according to claim 11, further comprising performing the next measurement by the measurement unit after the measurement unit receives the instructions,
wherein the arithmetic processing is completed within the time period for measurement for which the next measurement being continued to be performed by the measurement unit.

13. The method according to claim 11, wherein before starting the arithmetic processing the instructions are sent to the measurement unit.

14. The method according to claim 13, wherein after storing the measurement data in a storage unit the instructions are sent to the measurement unit.

15. The method according to claim 11, wherein after storing the measurement data in a storage unit the instructions are sent to the measurement unit.

* * * * *